United States Patent [19]

Blonder et al.

[11] Patent Number: 5,039,190
[45] Date of Patent: Aug. 13, 1991

[54] APPARATUS COMPRISING AN OPTICAL GAIN DEVICE, AND METHOD OF PRODUCING THE DEVICE

[75] Inventors: Greg E. Blonder, Summit; Dale C. Jacobson, Hackettstown, both of N.J.; Rodney C. Kistler, Easton, Pa.; John M. Poate, Summit, N.J.; Albert Polman, Berkeley Heights, N.J.

[73] Assignee: AT&T Bell Laboratories, Murray Hill, N.J.

[21] Appl. No.: 579,118

[22] Filed: Sep. 7, 1990

[51] Int. Cl.$^5$ .............................................. G02B 6/26
[52] U.S. Cl. ...................................... 359/341; 385/31; 385/142
[58] Field of Search .......................... 350/96.15, 96.12; 372/6

[56] References Cited

U.S. PATENT DOCUMENTS

| 3,947,087 | 3/1976 | Furuta et al. | 350/96.12 |
| 4,141,621 | 2/1979 | Aagard et al. | 350/96.12 |
| 4,750,801 | 6/1988 | Alferness | 350/96.12 |
| 4,826,282 | 5/1989 | Alferness | 350/96.12 |
| 4,902,086 | 2/1990 | Henry et al. | 350/96.12 |
| 4,904,036 | 2/1990 | Blonder | 350/96.11 |
| 4,923,279 | 5/1990 | Ainslie et al. | 350/96.30 |

OTHER PUBLICATIONS

"Review of Rare Earth Doped Fiber Lasers and Amplifiers", by P. Urquhart, *IEE Proceedings*, vol. 135, Pt. J, No. 6, Dec. 1988, pp. 385-407.
"Three-Level Fiber Laser Amplifier: A Theoretical Model", by J. R. Armitage, Applied Optics, vol. 27, No. 23, Dec. 1, 1988, pp. 4832-4836.
"Integrated Optics Physics and Applications", edited by S. Martellucci and A. N. Chester, Plenum Press, Chapter by G. Chartier, pp. 49-72.
"Ion Implanted Waveguides in Doped LiNbO$_3$", by P. J. Chandler et al, *Electronic Letters*, vol. 26, No. 5, Mar. 1, 1990, pp. 332-334.
"Ion-Implanted Nd:YAG Planar Waveguide Laser", by P. J. Chandler et al, *Electronics Letters*. vol. 25, No. 15, Jul. 20, 1989, pp. 985-986.
"Optical Waveguide of Nd-Doped Garnet Thin Film RF-Sputtered on Y$_3$Al$_5$O$_{12}$ Substrate", by M. Yamaga et al., *Japanese Journal of Applied Physics*, vol. 25, No. 2, Feb. 1986, pp. 194-199.
"Neodymium-Doped Silica Optical Waveguide Laser on Silicon Substrate", by Y. Hibino et al., *IEEE Photonics Technology Letters*, vol. 1, No. 11, Nov. 1989, pp. 349-350.
"Annealed Erbium-implanted Single-Mode LiNbO$_3$ Waveguides", by R. Brinkmann et al., *Proceedings of the Integrated Photonics Research Conference*, Mar. 26-28, 1990, pp. PD1-1-PD1-4.
"Nd-glass Thin-film Waveguide: An Active Medium for Nd Thin-film Laser", by B. Chen et al, *Applied Physics Letters*, vol. 28, No. 8, Apr. 15, 1976, pp. 435-437.
"Amplification at 1.06 μm Using a Nd: Glass Thin-film Waveguide", by H. Yajima et al., *Applied Physics Letters*, pl vol. 21, No. 9, Nov. 1, 1972, pp. 407-409.

Primary Examiner—William L. Sikes
Assistant Examiner—Phan T. Heartney
Attorney, Agent, or Firm—E. E. Pacher

[57] ABSTRACT

Disclosed is apparatus comprising an optically pumped optical gain device that comprises a rare earth (RE)-doped planar waveguide with non-uniform dopant distribution in the core of the waveguide. The RE ions are advantageously distributed such that the ions are concentrated in a core region in which the mode intensity of both signal radiation and pump radiation is relatively high. In preferred embodiments of a single mode planar waveguide according to the invention the RE ions are substantially concentrated in the central core region. A method of making the disclosed apparatus is also disclosed. The method involves implantation of RE ions into the core region.

12 Claims, 2 Drawing Sheets

APPARATUS COMPRISING AN OPTICAL GAIN DEVICE, AND METHOD OF PRODUCING THE DEVICE

FIELD OF THE INVENTION

This invention pertains to the field of optical gain devices, e.g., optical amplifiers, comprising rare earth-doped waveguide means.

BACKGROUND OF THE INVENTION

It has been known for some time that rare earth doped glasses in fiber form could be used as a lasing medium. However, it has only been recently that the possibility of using such fibers as the amplification medium in an optical fiber communication system has begun to be explored seriously. Most interest is currently directed towards fiber that comprises erbium ions. Among possible pump wavelengths ($\lambda_p$) are those in the 0.8 to 1.0 μm range (e.g., 0.98 μm) and those relatively close to (but below) the anticipated signal radiation wavelength $\lambda_s$ of about 1.5 μm (e.g., 1.48 μm). See, for instance, P. Urquhart, *I.E.E. Proceedings*, Vol. 135(part J, No. 6), pp. 385–407, Dec. 1988.

The principles of amplification of an optical signal in an Er-doped fiber amplifier are known to those skilled in the art. See, for instance, J. R. Armitage, *Applied Optics*, Vol. 27(23), pp. 4831–4836, Dec. 1988. Efforts have been undertaken to optimize the characteristics of Er-doped fiber amplifiers. See, for instance, U.S. Pat. No. 4,923,279, which discloses a single mode optical fiber having a core whose inner region contains the dopant and an outer region which is substantially dopant free. The matching of the dopant distribution and the signal mode field can reduce the pump threshold for a laser and improve the gain performance for a given pump power.

Although optical fiber amplifiers as described above can advantageously be used in a variety of communication systems, there are many potential applications for an optical amplifier to which fiber amplifiers are not readily or conveniently adapted. For instance, it would be desirable to be able to integrate an optical amplifier with electronic devices or circuits, since such integration can be expected to result in decreased cost, increased ruggedness, and possibly greater speed. Such integration would be facilitated by the availability of a planar optical amplifier. Furthermore, the availability of planar optical amplifiers would significantly advance progress towards fully integrated optics and, on a somewhat less advanced level, have immediate applications in such diverse fields as optical signal detection, optical backplanes of switching equipment, local area optical fiber networks, and optical fiber cable TV systems. Finally, planar optical amplifiers can be expected to be desirable replacements for optical fiber amplifiers, due to their more compact nature and increased ruggedness, and are likely to find application in undersea lightwave communication systems.

Planar optical waveguides are known. Among the known types of planar waveguides are silica-based glass waveguides disposed on a silicon substrate, as disclosed, for instance, in U.S. Pat. No. 4,902,086, incorporated herein by reference. For a broader discussion of planar optical waveguides, see, for instance, "Integrated Optics, Physics and Applications", edited by S. Martellucci et al., Plenum Press, especially the chapter by G. Chartier, pp. 49–72. On page 53 of that monograph can be found a compilation of materials in which optical waveguides have been formed, together with a listing of fabrication techniques used. On pages 63 to 65 of the monograph can be found a discussion of waveguide formation by means of ion implantation. As described there, the technique involves exposing a substrate to a collimated ion beam, resulting in modification of the properties of an appropriately shaped region of the substrate that manifests itself as a change in refractive index of the region.

P. J. Chandler et al., *Electronics Letters*, Vol. 26(5), pp. 332–334 (March 1990) report on the fabrication of optical waveguides by implantation of inert ions (He+) into single crystal $LiNbO_3$ bodies. The $LiNbO_3$ was uniformly doped with MgO, or Nd and Cr.

P. J. Chandler, et al., *Electronics Letters*, Vol. 25(15), pp. 985–986 (July 1989) report formation of a planar waveguide laser by implantation of He+ ions into a standard laser crystal (Nd:YAG).

M. Yamaga et al., *Japanese Journal of Applied Physics*, Vol. 25(2), pp. 194–199 (February 1986) prepared Nd-doped garnet films on single crystal YAG substrates by sputter deposition.

Y. Hibino, *I.E.E.E. Photonics Technology Letters*, Vol. 1(11), pp. 349–350 (November 1989) disclose formation of a Nd-doped silica optical waveguide laser on a Si substrate by a technique that involves depositing glass soot onto the substrate, soaking the soot layer in Nd-containing alcohol, sintering of the soot layer, patterning of the sintered layer to form a 20 μm wide core ridge, and overcladding the thus formed core strip with a glass cladding that was also formed from soot. Fluorescence and lasing were observed.

R. Brinkman et al., *Proceedings of the Integrated Photonics Research Conference*, Hiltonhead, S.C., Mar. 26–28, 1990, pp. PD-1 to PD-2, report manufacture of annealed Er-implanted single mode waveguides in single crystal $LiNbO_3$. The manufacturing process comprised implanting $10^{16}$ cm$^{-2}$ Er ions at 200 keV into the $LiNbO_3$ surface. The resulting very shallow Er distribution (50 nm width, peak at 70 nm depth) was then spread out by means of an annealing treatment. The anneal also resulted in epitaxial re-growth of the amorphized surface layer of the $LiNbO_3$ substrate. After a 45 hour anneal the maximum of the Er distribution ($6 \times 10^{19}$ cm$^{-3}$) occurred at the substrate surface, with a 1/e penetration depth of 1.8 μm. In thus prepared Er-doped $LiNbO_3$ samples waveguides were formed by Ti indiffusion, as well as by proton exchange. The resulting waveguides apparently were about 95 nm deep. Thus, the Er distribution was essentially constant throughout the waveguide. Fluorescence was observed in the thus produced waveguides.

In view of the potentially high commerical significance of planar optical gain devices (e.g., amplifiers and lasers), improved such devices would clearly be of interest. In particular, devices having improved matching of the dopant atom distribution to the mode field of the signal radiation in the planar waveguide of the device would be very desirable, since such improved matching can, inter alia, result in improved gain performance of the device. This application discloses a waveguide with such improved matching, and a technique for making the waveguide.

SUMMARY OF THE INVENTION

In a broad aspect the invention is an article that comprises an improved optical gain device, and a method of making the article. More particularly, the gain device comprises planar waveguide means disposed on a substrate. The waveguide means comprise a core and a cladding and are adapted for guiding signal radiation of wavelength $\lambda_s$. The article further comprises means for coupling pump radiation of wavelength $\lambda_p < \lambda_s$ into the planar waveguide means. Exemplarily, $1 \lesssim \lambda_s \leq 3$ μm, and $0.4 \lesssim \lambda_p < 3$ μm. The planar waveguide means comprise silica-based glass that contains at least one species of rare earth (RE) ions capable of luminescence in response to the pump radiation. Significantly, the RE ions are non-uniformly distributed in the planar waveguide means. In particular, the RE ions are distributed such that, in a given core cross section, the maximum concentration of RE ions in a first region of the cross section is at least twice as high as the maximum concentration of the RE ions in a second region (typically the remainder) of the cross section. In preferred embodiments the RE ions are distributed such that the ions are concentrated in the core region where the mode intensity of both signal radiation and pump radiation is highest. Typically this will be the center region of core.

In preferred embodiments at least a part of the second region is disposed between the first region and the "top" surface of the core, i.e., the part of the core surface that is not adjacent to the substrate. In particularly preferred embodiments the second region substantially surrounds the first region.

In a particular embodiment the substrate is a single crystal Si body, e.g., a wafer, with at least a part of a major surface of the body covered by a $SiO_2$ layer. The core of the planar waveguide means consists of silica-based glass (e.g., phosphosilicate). The core material is disposed on the $SiO_2$ layer, and is substantially covered by a silica-based glass that serves, together with the $SiO_2$ layer, as cladding. The refractive index of all of the cladding material is lower than that of the core material. In this particular case the RE ions are Er ions.

Gain devices according to the invention typically are amplifiers but could be lasers, and typically are disposed on a substrate in or on which there is at least one other optical or electro-optical device that is in optical communicationrelationship with the gain device. The other device exemplarily is a pump laser or a photodetector. Optionally there is also one or more electronic device (e.g., a transistor) or IC in or on the substrate.

The method of making an article according to the invention exemplarily comprises providing the substrate (typically a Si wafer with a $SiO_2$ layer thereon) with a layer of silica-based core material thereon, exposing at least a portion of said layer to RE ions such that at least a major portion of said ions is caused to be implanted into the core material, patterning, either before or after the implantation, the layer of core material such that the core of the planar waveguide means results, and depositing a layer of cladding material. The method is practiced such that in the finished article the RE distribution in the core is non-uniform, as described above.

DETAILED DESCRIPTION OF SOME PREFERRED EMBODIMENTS

Figure 1:
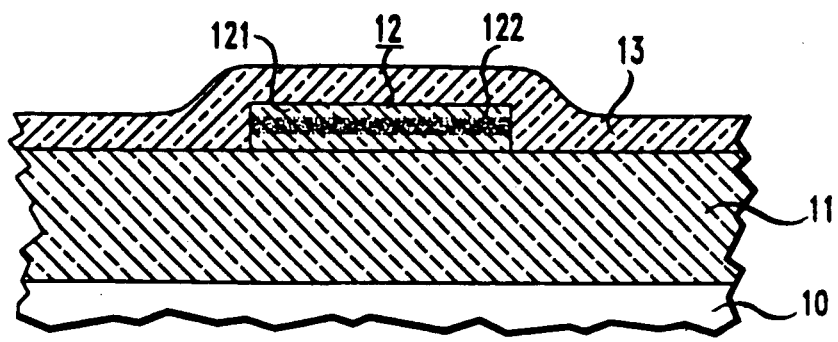
FIGS. 1 and 2 schematically show cross sectional views of exemplary RE-containing planar waveguide means according to the invention.

FIG. 1 schematically depicts the cross section of waveguide means of a gain device according to the invention. Numeral 10 refers to a substrate body, preferably a Si body, and numeral 11 refers to first cladding material, preferably $SiO_2$ formed by oxidation of the Si body. Core 12 is disposed on 11, with second cladding material 13 surrounding the core. The core comprises a first region 122 having a relatively high RE (exemplarily Er) concentration, and a second region 121 having a relatively low RE concentration. The maximum RE concentration in 122 is at least twice (preferably at least 5 times or even 10 times) the maximum concentration in 121. The second cladding can be $SiO_2$ but could be any other appropriate transparent (at $\lambda_s$) medium, provided the refractive index of the core glass is sufficiently higher than that of the second cladding material (and, of course, also than that of the first cladding material) such that radiation of wavelength $\lambda_s$ (and also of wavelength $\lambda_p$) is guided in the structure.

Figure 2:
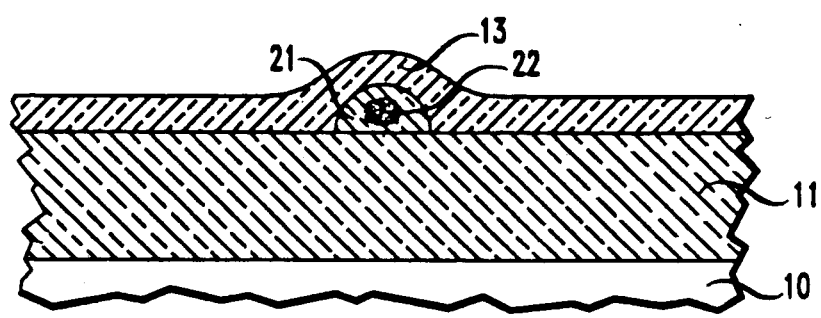

FIG. 2 schematically depicts the cross section of another waveguide means according to the invention that differs from that of FIG. 1 in that, inter alia, the first core region 22 is surrounded by the second core region 21. This results in particularly efficient coupling between the dopant atoms and the mode field of the signal radiation if the waveguide is a single mode guide at $\lambda_s$.

RE-implanted waveguides of the type shown in FIG. 1 exemplarily can be made by first forming a relatively thick cladding layer on a substrate surface, depositing on the cladding layer a silica-based core glass layer of appropriate thickness (e.g., about 2 μm), optionally depositing a relatively thin (e.g., 0.1 μm) conducting layer atop of the core glass layer in order to avoid charge build-up during ion implantation, and exposing the described multilayer structure to a beam of energetic (exemplarily 1–5 MeV) RE ions. Advantageously the ion energy is selected such that the maximum of the resulting RE distribution in the core glass layer is substantially centered in the layer. The ion dose generally is selected such that the desired gain can be achieved in a predetermined length of waveguide. Exemplarily the dose is in the range $10^{16}$–$10^{17}$ ions/cm². The substrate temperature during implantation advantageously is between room temperature (about 22° C.) and about 500° C., preferably between 150° C. and 300° C.

After completion of the implantation the optional conductive layer is removed and the waveguide is defined by removing unwanted core material by a known technique, exemplarily including lithography and etching. Subsequently the upper cladding layer (exemplarily $SiO_2$) is formed by a known technique, e.g., by low pressure chemical vapor deposition (LPCVD).

Waveguides of the type shown in FIG. 2 can exemplarily be produced by a process similar to the above described one, except that the core material is implanted through a mask that limits the lateral extent of the implanted region. The implantation can be carried out prior or subsequent to patterning of the core layer, as those skilled in the art will recognize. It can also be made by a technique similar to that described in Example 2 below.

Figure 3:
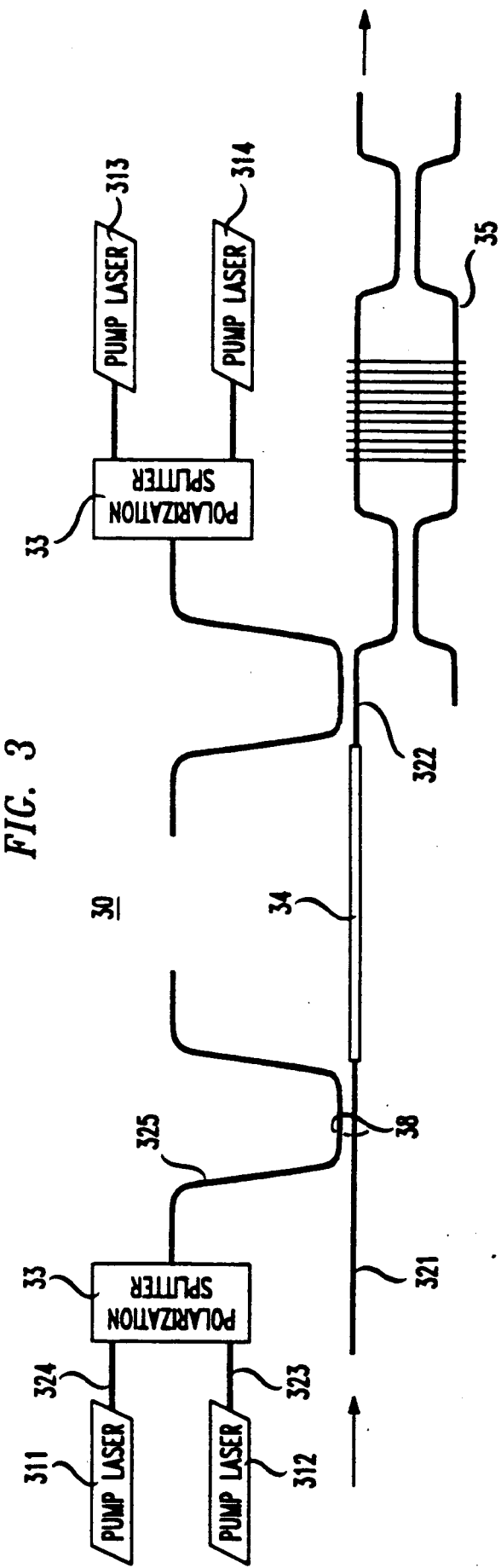
FIG. 3 depicts schematically an exemplary optical amplifier according to the invention.

FIG. 3 schematically depicts an optical amplifier 30 according to the invention. The exemplary amplifier comprises four pump lasers (311-314), of which two (e.g., 312 and 314) are "spares". Lasers 311 and 313 inject co-propagating and counter-propagating radiation, respectively. Of course, all pump lasers in excess of one are optional. Signal radiation propagates through passive waveguide section 321 to amplifier waveguide 34, is amplified therein through stimulated emission, with the amplified signal radiation propagating through passive waveguide section 322. Pump radiation from 311 is guided by passive waveguide 324 to polarization splitter 33, and from there by passive guide 325 to directional coupler 38. These components can be conventional, and can be either discrete or integrated. Coupler 38 serves to couple the pump radiation into 321 such that it propagates in the direction of signal flow. The counter-propagating pump radiation is similarly coupled into the signal path. Optional known grating filter 35 serves to suppress spontaneous emission. Optical fiber can be coupled to such an amplifier assembly, exemplarily in a manner substantially as disclosed in U.S. Pat. No. 4,904,036, incorporated herein by reference.

Figure 4:
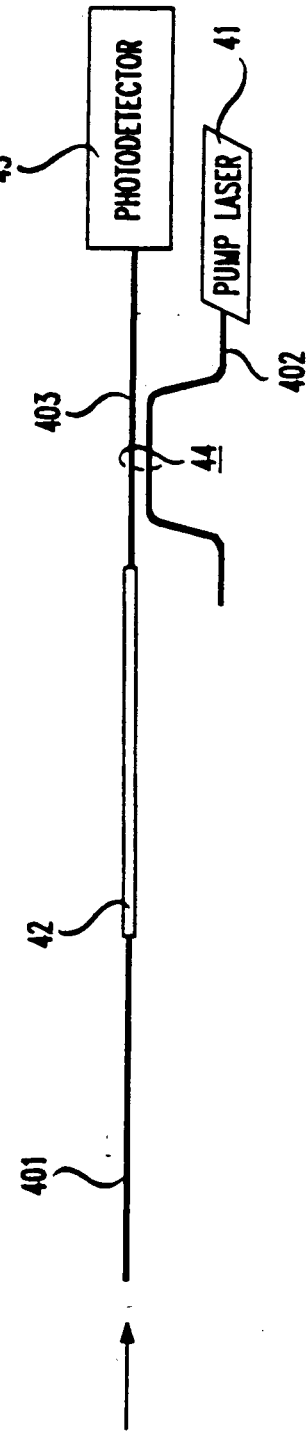
FIG. 4 shows schematically a photodetector with an amplifier according to the invention.

FIG. 4 schematically depicts a further exemplary article according to the invention, namely, a detector assembly. Signal radiation propagates through passive guide 401 to amplifier section 42, and further through passive guide 403 to photodetector 43, exemplarily a PIN diode disposed over a waveguide turning mirror. Pump radiation from pump laser 41 is coupled by means of directional coupler 44 into 403. A detector assembly of the type shown in FIG. 4 can have the high sensitivity typically associated with avalanche photodiodes (APDs) and the low noise typically associated with PINs.

Figure 5:
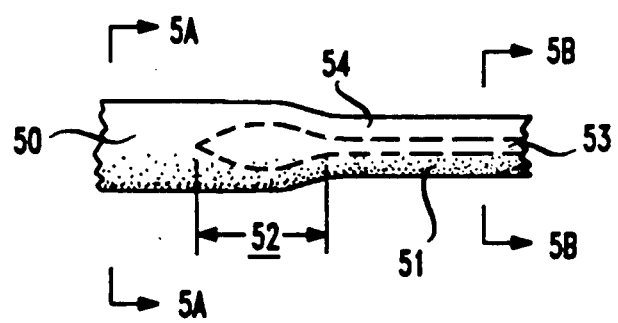
FIGS. 5, 5A and 5B schematically depicts a passive planar waveguide coupled to planar waveguide means according to the invention by means of an adiabatic transition section.
Figure 5A:
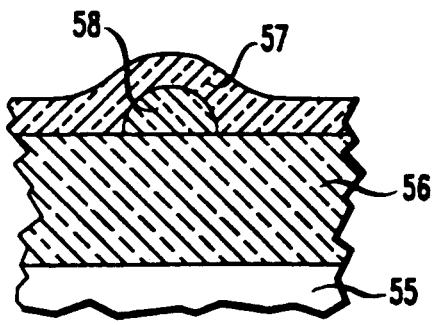
Figure 5B:
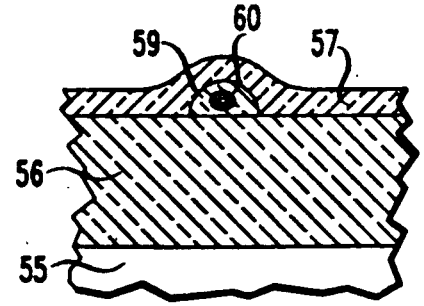

In articles according to the invention there will typically be found junctions between passive waveguide sections and amplifier sections. FIG. 5 exemplarily shows, in top view, a section of passive waveguide 50, a section of amplifier guide 51, and transition section 52 therebetween. FIG. 5A shows section A—A of FIG. 5, with substrate 55, lower cladding 56, core 58, and upper cladding 57. FIG. 5B shows section B—B of FIG. 5 wherein the core of the amplifier section comprises outer region 59 that is substantially free of RE, and center region 60 that contains substantially all of the RE. As those skilled in the art will appreciate, it will frequently be advantageous if the amplifier guide is somewhat narrower than the passive guide, so as to achieve improved amplification efficiency. In such a case it will typically be advantageous to provide for an adiabatic transition between the two waveguide sections, as shown schematically in FIG. 5.

An important advantage of articles according to the invention is the relatively low loss coupling that is possible between the planar waveguides and standard silica-based optical fiber. Thus, in articles according to the invention, the refractive index of the core of the planar waveguide will typically differ by at most 5% from the effective refractive index of the core of the optical fiber that is to be coupled to the planar waveguide.

Although the discussion has been primarily in terms of a planar waveguide optical amplifier, those skilled in the art will realize substantially the same principles can be embodied in a planar waveguide laser, provided that the structure is modified to provide an appropriate optical cavity. Workers in this field will be readily able to do this.

Furthermore, silica cladding and phosphosilicate glass are not the only possible waveguide materials. For instance, the core can be RE-doped $Si_3N_4$ and the cladding can be silica-based glass. Er is not the only RE species useful in the practice of the invention. For instance, Nd can be used and is of considerable interest because of its transition at $\lambda \sim 1.3$ $\mu$m, coinciding with the minimum dispersion window of conventional silica fiber. Other RE species have different transitions that may be of interest for particular applications.

Still furthermore, gain devices according to the invention do not necessarily have to be produced by a technique that includes ion implantation. We currently believe that at least planar guides of the type shown in FIG. 1 can be produced by CVD, by appropriate introduction of a RE-containing precursor into the reactor, or by sputtering from a sequence of targets.

EXAMPLE 1

On a conventional Si wafer was formed a 15 $\mu$m thick silica layer by conventional high-pressure thermal oxidation of the Si (HIPOX). On the thus formed silica surface was deposited a 2 $\mu$m thick layer of phosphosilicate glass (8 weight % P in $SiO_2$) by conventional low-pressure chemical vapor deposition (LPCVD) using silane, oxygen, and phosphine. This was followed by conventional deposition of a 0.11 $\mu$m thick layer of Al on top of the P-glass (core) layer. Into the thus prepared multilayer structure were implanted 2.9 MeV $Er^{++}$ ions in a vacuum at a base pressure below $10^{-6}$ Torr. The implantation fluence was $3.4 \times 10^{16}$ ions/cm$^2$. During implantation the wafer was kept at 200° C. The resulting Er distribution had approximately Gaussian shape, with the peak at about 1 $\mu$m depth from the glass/Al interface, and with a full width at half maximum of about 0.6 $\mu$m. Subsequently the Al layer was removed by conventional means, and the core material layer was patterned by conventional lithography and etching such that a 5 $\mu$m wide and 5.5 cm long strip of core material remained on the substrate. The planar waveguide was completed by deposition of a 5 $\mu$m thick layer of silica by LPCVD from silane and oxygen, followed by densification of the layer in a nitrogen ambient at 1000° C. The planar waveguide was designed to support only a single mode at $\lambda = 1.54$ $\mu$m and, when pumped at $\lambda = 0.9729$ $\mu$m, exhibited a luminescent transition centered around $\lambda = 1.54$ $\mu$m. A lifetime of about 4 ms was observed. When the waveguide was pumped at $\lambda = 0.9729$ $\mu$m, signal radiation at $\lambda_s = 1.536$ $\mu$m that was transmitted through the 5.5 cm length of waveguide showed significantly increased amplitude, as compared to transmission in the absence of pumping.

EXAMPLE 2

A Er-doped planar waveguide is made substantially as described in Example 1, except that the Er-doped guide is disposed between two conventional passive waveguide sections, that a further section of passive waveguide is coupled to the Er-doped guide by means of a conventional directional coupler, and in that the core material is deposited in two steps, with Er implantation between the steps. In particular, a 3 μm thick layer of 8% P-glass is deposited, Er is implanted as described in Example 1, the P-glass layer is patterned such that a 3 μm wide and 5.5 cm long strip of implanted core material remains on the substrate. Subsequently, a 1 μm thick layer of 8% P-glass is deposited and patterned such that the Er-implanted region is covered by the later deposited P-glass, and the resulting core width is 5 μm. As described in Example 1, an appropriate cladding layer is subsequently deposited.

We claim:

1. An article comprising an optical gain device that comprises optical waveguide means comprising a core and a cladding, associated with each of said core and cladding being a refractive index, the refractive index of the cladding being lower than the refractive index of the core, such that the waveguide means are adapted for guiding signal radiation of wavelength $\lambda_s$, and the gain device further comprises coupling means adapted for coupling pump radiation of wavelength $\lambda_p < \lambda_s$ into said optical waveguide means; the optical waveguide means comprising core material containing at least one species of rare earth ions capable of luminescence in response to the pump radiation, wherein associated with the rare earth ions in the core is a concentration of the rare earth ions, including a maximum concentration in a given region of the waveguide means;

Characterized in that (a) the waveguide means are planar waveguide means disposed on a substrate; and
(b) associated with the planar waveguide means is a core cross section and a core surface that is not adjacent to the substrate, and the rare earth ions are distributed in the planar waveguide means such that, in a given cross section, the maximum concentration of rare earth ions in a first region of the cross section is at least twice as high as the maximum concentration of the rare earth ions in a second region of the cross section.

2. The article of claim 1, wherein at least a part of the second region is disposed between the first region and a part of the core surface that is not adjacent to the substrate.

3. Article of claim 2, wherein the second region of the given cross section substantially surrounds the first region.

4. Article of claim 1, wherein the rare earth ions comprise Er ions.

5. Article of claim 1, wherein $1 \lesssim \lambda_s \leq 3$ μm and $0.4 \lesssim \lambda_p < 3$ μm.

6. The article of claim 2, wherein the substrate is a Si body having a major surface, with at least a part of the major surface covered by a $SiO_2$ layer, wherein the core of the waveguide means consists of silica-based glass and is disposed on said $SiO_2$ layer, wherein the part of the core surface that is not adjacent to the substrate is contacted by a second silica-based glass of a composition such that the refractive index of the core glass is higher than the refractive index of the second silica based glass, and wherein the rare earth ions consist essentially of the second silica based glass, and wherein the rare earth ions consist essentially of Er ions.

7. The article of claim 1, wherein the gain device is an optical amplifier.

8. The article of claim 7, wherein in or on the substrate there is at least one other optical or electro-optical device that is in optical communication-relationship with the optical amplifier.

9. The article of claim 8, wherein the at least one other device is a photodetector disposed such that it receives radiation that has propagated through the optical amplifier.

10. The article of claim 8, wherein the at least one other device is a laser adapted for emitting the pump radiation.

11. The article of claim 1, further comprising an optical fiber signal-transmissively coupled to the planar optical waveguide means, coupled to the planar optical waveguide means, associated with each of the fiber and the planar waveguide means being a core effective refractive index, wherein the core effective refractive index of the fiber differs from that of the planar waveguide means by at most 5%.

12. Method of making an article that comprises an optical gain device that comprises optical waveguide means comprising a core and a cladding, associated with each of said core and cladding being a refractive index, the refractive index of the cladding being lower that the refractive index of the core, such that the waveguide means are adapted for guiding signal radiation of wavelength $\lambda_s$, and the gain device further comprises coupling means for coupling pump radiation of wavelength $\lambda_p < \lambda_s$ into the optical waveguide means, Characterized in that the method comprises (a) providing a substrate having a major surface, with a layer comprising core material on the major surface;
(b) exposing at least a portion of said layer to rare earth ions such that at least a major portion of said ions is caused to be implanted into said core material; associated with the rare earth ions implanted into the core material is a concentration of rare earth ions, including a maximum concentration in a given region of the core material;
(c) patterning, either before or after step (b), said layer such that the core of said optical waveguide means results; associated with the core is a cross section and a core surface that is not adjacent to the substrate surface; and wherein the method is practiced such that the rare earth ions are distributed in the core such that, in a given cross section of the core, the maximum concentration of rare earth ions in a first region is at least twice as high as the maximum concentration of the rare earth ions in a second region of the cross section, with at least a part of the second region disposed between the first region and a part of the core surface that is not adjacent to the substrate surface; and
(d) depositing cladding material.

* * * * *

UNITED STATES PATENT AND TRADEMARK OFFICE
CERTIFICATE OF CORRECTION

PATENT NO. : 5,039,190

DATED : August 13, 1991

INVENTOR(S) : Greg E. Blonder, Dale C. Jacobson, Rodney C. Kistler, John M. Poate, and Albert Polman It is certified that error appears in the above-identified patent and that said Letters Patent is hereby corrected as shown below:

Column 8, lines 1, 2 and 3, "and wherein the rare earth ions consist essentially of the second silica based glass, and wherein the rare earth ions consist essentially of Er ions" should read --and wherein the rare earth ions consist essentially of Er ions--; lines 19, 20 and 21, "optical waveguide means, coupled to the planar optical waveguide means, associated with each of the fiber and the planar" should read --optical waveguide means, associated with each of the fiber and the planar--.

Signed and Sealed this

Twenty-ninth Day of December, 1992

Attest:

DOUGLAS B. COMER

Attesting Officer

Acting Commissioner of Patents and Trademarks